United States Patent
He et al.

(10) Patent No.: US 12,473,444 B2
(45) Date of Patent: Nov. 18, 2025

(54) MARKER INKS AND METHODS FOR PREPARING THEREOF

(71) Applicant: SHENZHEN THOUSANDSHORES TECHNOLOGY CO., LTD., Guangdong (CN)

(72) Inventors: Ding He, Shenzhen (CN); Zhi Liu, Shenzhen (CN); Xufeng Yang, Shenzhen (CN); Dengwu Wu, Shenzhen (CN); Guohui Yang, Shenzhen (CN)

(73) Assignee: SHENZHEN THOUSANDSHORES TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/981,622

(22) Filed: Dec. 15, 2024

(65) Prior Publication Data
US 2025/0282965 A1    Sep. 11, 2025

(30) Foreign Application Priority Data
Mar. 11, 2024    (CN) .................. 202410273459.2

(51) Int. Cl.
C09D 11/17    (2014.01)

(52) U.S. Cl.
CPC .................. C09D 11/17 (2013.01)

(58) Field of Classification Search
CPC .................. C09D 11/17
See application file for complete search history.

(56) References Cited

U.S. PATENT DOCUMENTS

| | | | |
|---|---|---|---|
| 5,909,978 A * | 6/1999 | Giordano | B43K 8/06 401/199 |
| 10,190,008 B2 * | 1/2019 | Oriakhi | B41M 7/0036 |
| 2011/0227996 A1 * | 9/2011 | Ikoshi | C09D 11/322 524/215 |
| 2012/0062644 A1 * | 3/2012 | Hara | B41J 2/155 106/31.86 |
| 2013/0079447 A1 * | 3/2013 | Koike | C09D 11/106 524/377 |
| 2013/0106945 A1 * | 5/2013 | Ikeda | C09D 11/326 347/20 |
| 2018/0371280 A1 * | 12/2018 | Garzon | B41M 5/0023 |
| 2020/0039245 A1 * | 2/2020 | Akima | B41J 11/00214 |

FOREIGN PATENT DOCUMENTS

| | | | | |
|---|---|---|---|---|
| JP | 6524090 B2 * | 6/2019 | | B05D 5/06 |
| JP | 2023110818 A * | 8/2023 | | |
| JP | 2023119427 A * | 8/2023 | | |
| WO | WO-2013008691 A1 * | 1/2013 | | C09D 11/322 |

OTHER PUBLICATIONS

English machine translation of JP-2023110818-A (Year: 2023).*
English machine translation of JP-2023119427-A (Year: 2023).*
English machine translation of WO-2013008691-A1 (Year: 2013).*
English machine translation of JP-6524090-B2 (Year: 2019).*

* cited by examiner

*Primary Examiner* — Amber R Orlando
*Assistant Examiner* — Jeffrey Eugene Barzach
(74) *Attorney, Agent, or Firm* — PORUS IP LLC

(57) ABSTRACT

Embodiments of the present disclosure provide a marker ink and a method for preparing thereof. The marker ink comprises a water-based acrylic resin, a pigment paste, a cross-linking agent, and water. A mean diameter of a pigment in the pigment paste is less than 150 nm.

20 Claims, 1 Drawing Sheet

100

MARKER INKS AND METHODS FOR PREPARING THEREOF

CROSS-REFERENCE TO RELATED APPLICATIONS

The present disclosure claims priority to Chinese application No. 202410273459.2, filed on Mar. 11, 2024, the entire contents of which are incorporated herein by reference.

TECHNICAL FIELD

The present disclosure relates to the field of ink research and development and manufacturing, and in particular, to a marker ink and a method for preparation thereof.

BACKGROUND

Acrylic pigments are popular among many artists and enthusiasts due to their vibrant colors, strong opacity, fast drying time, and good adhesion to most substrates. Currently, products that use acrylic pigments include valve-type acrylic pens and cotton-core acrylic pens. Valve-type acrylic pens require multiple shakes of the pen body and pressing of the pen tip before use, leading to a poor user experience. Although cotton-core acrylic pens do not require shaking or pressing, pigment sedimentation in the ink can occur, resulting in ink stratification and poor ink adhesion. Therefore, there is a need to provide a marker ink and a method for preparing thereof.

SUMMARY

One of the embodiments of the present disclosure provides a marker ink. The marker ink includes a first water-based acrylic resin, a pigment paste, a cross-linking agent, and water. A mean diameter of a pigment in the pigment paste is less than 150 nm.

In some embodiments, the first water-based acrylic resin is a polyester-modified acrylic resin.

In some embodiments, the polyester-modified acrylic resin is a polyethylene glycol-modified acrylic resin In some embodiments, a weight ratio of the pigment paste to the first water-based acrylic resin is in a range of 1:0.9-1:4.5.

In some embodiments, the cross-linking agent includes a blocked isocyanate.

In some embodiments, the cross-linking agent includes a partially methylated amino resin.

In some embodiments, the pigment paste is prepared from a second water-based acrylic resin, the pigment, a dispersant, and water.

In some embodiments, by weight, the first water-based acrylic resin accounts for 15 to 25 parts, the pigment paste accounts for 25 to 40 parts, the cross-linking agent accounts for 1 to 5 parts, and the remainder is the water.

In some embodiments, the marker ink further comprises a humectant, a surfactant, a pH regulator, a leveling agent, a dispersant, and a preservative.

In some embodiments, the humectant is selected from one or a combination of a glycerol, an ethylene glycol, a diethylene glycol, a triethylene glycol, a 1,2-propanediol, a 1,3-propanediol, a 1,3-butanediol, a 1,2-pentanediol, a polyethylene glycol, and a reduced glycerol ether.

In some embodiments, the pH regulator is selected from one or a combination of a triethanolamine, a dimethylamine, and a triethylamine.

In some embodiments, by weight, the humectant accounts for 3 to 5 parts, the surfactant accounts for 0.1 to 6 parts, the pH regulator accounts for 0.1 to 1 part, the leveling agent accounts for 0.1 to 1 part, the dispersant accounts for 0.1 to 6 parts, and the preservative accounts for 0.05 to 0.2 parts.

One of the embodiments of the present disclosure provides a method got preparing a marker ink. The method comprises dispersing a first water-based acrylic resin, a pigment paste, and a cross-linking agent into water to obtain a first mixture; and filtering and defoaming the first mixture to obtain the marker ink. A mean diameter of a pigment in the pigment paste is less than 150 nm.

In some embodiments, the first water-based acrylic resin is a polyester-modified acrylic resin, the polyester-modified acrylic resin is a polyethylene glycol-modified acrylic resin, and the cross-linking agent includes a blocked isocyanate or a partially methylated amino resin.

In some embodiments, the method further comprises mixing and grinding a second water-based acrylic resin, a pigment, a dispersant, and water to obtain a second mixture; and centrifuging and filtering the second mixture to obtain the pigment paste.

In some embodiments, by weight, the first water-based acrylic resin accounts for 15 to 25 parts, the pigment paste accounts for 25 to 40 parts, the cross-linking agent accounts for 1 to 5 parts, and the remainder is the water. A weight ratio of the pigment paste to the first water-based acrylic resin is in a range of 1:0.9-1:4.5.

In some embodiments, the method further comprises: mixing a humectant, a surfactant, a pH regulator, a leveling agent, a dispersant, a preservative, and water to obtain a third mixture; adding the first mixture to the third mixture and mixing to obtain a fourth mixture; and filtering and defoaming the fourth mixture to obtain the marker ink.

In some embodiments, the humectant is selected from one or a combination of a glycerol, an ethylene glycol, a diethylene glycol, a triethylene glycol, a 1,2-propanediol, a 1,3-propanediol, a 1,3-butanediol, a 1,2-pentanediol, a polyethylene glycol, and a reduced glycerol ether, and the pH regulator is selected from one or a combination of a triethanolamine, a dimethylamine, and a triethylamine.

In some embodiments, by weight, the humectant accounts for 3 to 5 parts, the surfactant accounts for 0.1 to 6 parts, the pH regulator accounts for 0.1 to 1 part, the leveling agent accounts for 0.1 to 1 part, the dispersant accounts for 0.1 to 6 parts, and the preservative accounts for 0.05 to 0.2 parts.

One of the embodiments of the present disclosure provides a marker pen. The marker pen includes a nib, a barrel, and a marker ink. The marker ink includes a first water-based acrylic resin, a pigment paste, a cross-linking agent, and water. A mean diameter of a pigment in the pigment paste is less than 150 nm.

Additional features may be outlined in part in the description which follows, and in part may become apparent to those skilled in the art upon examination of the following and the accompanying drawings or may be learned by the production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and where.

DETAILED DESCRIPTION

As used in the disclosure and the appended claims, the singular forms "a," "an," and "the" include plural referents unless the content dictates otherwise. In general, the terms "comprise" and "include" merely prompt to include steps and elements that have been clearly identified, and these steps and elements do not constitute an exclusive listing. The methods or the devices may also include other steps or elements.

Numerical ranges used herein are intended to concisely and concisely describe each value included within that range.

One of the embodiments of the present disclosure provides a marker ink. The marker ink may include a first water-based acrylic resin, a pigment paste, a cross-linking agent, and water. A mean diameter of a pigment in the pigment paste is less than 150 nm.

The first water-based acrylic resin refers to a water-based acrylic resin used for mixing with the pigment paste to prepare the marker ink. The water-based acrylic resin is a polymeric material synthesized based on acrylic acid and its ester monomers, and is usually prepared by manners such as emulsion polymerization or solution polymerization. The water-based acrylic resin possesses excellent features such as environmental friendliness, weather resistance, adhesion, film-forming ability, and water resistance. The water-based acrylic resin may be dispersed in water or emulsified to form an acrylic resin emulsion, an acrylic resin aqueous dispersion, or an acrylic resin aqueous solution.

When a solvent in an ink evaporates, the first water-based acrylic resin forms a strong film that holds a pigment in place and creates a durable image or text. A structure of the first water-based acrylic resin is conducive to keeping the pigment dispersed through electrostatic or cubic space effects, thus ensuring the stability and fluidity of the ink during use. A molecular structure of the first water-based acrylic resin may produce strong adhesion with a wide range of substrates, for example, paper, plastics, or the like, thereby improving the adhesion and durability of the ink. The first water-based acrylic resin has good weather resistance, water resistance, light resistance, and chemical resistance, which results in better long-term stability of the ink and is suitable for use in a variety of environments.

In some embodiments, the first water-based acrylic resin includes at least one of an acetate-modified acrylic resin, a polyurethane-modified acrylic resin, or an amino-modified acrylic resin. In some embodiments, the first water-based acrylic resin is a polyester-modified acrylic resin. The polyester-modified acrylic resin is a resin that is produced by co-polymerizing polyester with acrylic monomers. The polyester-modified acrylic resin combines the advantages of polyester resins, such as excellent weathering and mechanical properties, with the advantages of acrylic resins, such as high adhesion, good processing properties, and chemical stability.

In some embodiments, a source from which the polyester-modified acrylic resin is purchased is not specifically limited. By way of example only, the polyester-modified acrylic resin is purchased from one or a combination of one or more of the following: SX-1420 from Guangdong Changzhou Chemical Co., Ltd., Joncryl 586 and Joncryl 690 from Guangzhou Arles New Materials Co., Ltd., and RESIN HF-05A from Dow Chemical.

A polyester modification can enhance the flexibility of an acrylic resin and improve ink adhesion. The acrylic resin itself is a relatively brittle film, the polyester-modified acrylic resin after a polyester modification has good flexibility, so the ink can be used on a variety of substrates, such as metal or glass, to maintain good adhesion and avoid drying-induced cracking, which affects the writing experience.

In some embodiments, the polyester-modified acrylic resin is a polyethylene glycol-modified acrylic resin. The polyethylene glycol-modified acrylic resin is a resin that is produced by co-polymerizing polyethylene glycol with acrylic monomers. In some embodiments, the polyethylene glycol-modified acrylic resin includes a sin produced by subjecting a polyethylene glycol 20000 to a co-polymerization reaction with acrylic monomers. The polyethylene Glycol 20000 (PEG 20000) is a polyethylene glycol with a high molecular weight of approximately 20,000 Daltons. The PEG 20000 has a long molecular chain and a high molecular weight.

Polyethylene glycol (PEG) is a long-chain polymer. Due to the flexibility, intermolecular interactions, and structural characteristics of its molecular chains, it can withstand significant deformation without easily breaking, thereby exhibiting excellent flexibility. Therefore, the polyethylene glycol-modified acrylic resin produced by co-polymerizing polyethylene glycol with acrylic monomers has good flexibility, which improves ink adhesion.

The pigment paste is a color paste formed by dispersing the pigment in a medium. In some embodiments, the pigment paste is prepared from a second water-based acrylic resin, the pigment, a dispersant, and water. The second water-based acrylic resin is a water-based acrylic resin that is configured to mix with the pigment to prepare the pigment paste. In some embodiments, the second water-based acrylic resin includes at least one of a pure acrylic resin, an alcohol ether-type acrylic resin, or an epoxy acrylic copolymer resin. In some embodiments, a type of the second water-based acrylic resin may be the same as or different from a type of the first water-based acrylic resin.

Adding the second water-based acrylic resin can thicken the pigment paste, disperse the pigment, and avoid the problems of pigment chalking, bad wrapping, and coating cracking.

The pigment is a substance that provides color to a material or substance. In some embodiments, the pigment includes at least one of an inorganic pigment, an organic pigment, or a natural pigment. In some embodiments, the pigment includes a white pigment, a red pigment, a yellow pigment, a blue pigment, and other pigments compounded with a red pigment, a yellow pigment, and a blue pigment. By way of example only, the pigment used is from the BadischeAnilin Soda Fabrik Ga (BASF) Cromophtal series, such as Red P1610, BASF K3580, BASF Irgalite K1740, or BASF L7080, or a combination of one or more of these.

The dispersant is an additive used to uniformly disperse a substance in another medium, avoiding aggregation or settling of the substance to achieve a stable dispersion state. In some embodiments, the dispersant includes an adsorptive dispersant, a charge dispersant, a non-ionic dispersant, and a complex dispersant. By adding the dispersant at the stage of preparing the pigment paste, the mutual attraction, e.g., van der Waals or electrostatic forces, between pigment particles is reduced, compatibility between the pigment particles and the medium is increased, and it is ensured that the pigment particles do not accumulate in the liquid, thereby allowing the pigment particles to be dispersed to ensure that the color of the ink is uniform and stable, and to prevent the pigment particles from settling or agglomerating.

In some embodiments, the second water-based acrylic resin, the pigment, the dispersant, and water are mixed and ground to obtain a second mixture, and the second mixture is centrifuged and filtered to obtain the pigment paste. For more on the specific manner of preparing the pigment paste, please refer to FIG. 1 and its related descriptions.

In some embodiments, a mean diameter of a pigment in the pigment paste is less than 150 nm.

The mean diameter of the pigment in the pigment paste being less than 150 nm can enable the pigment paste to have better anti-sinking performance and color spreading performance. On the one hand, when the mean diameter of the pigment in the pigment paste is less than 150 nm, the pigment particles in the pigment paste remain suspended and are not easily precipitated, ensuring good stability, which overcomes issues found in commercially available cotton-core marker inks, such as ink stratification, dry ink during writing, and color discrepancies. On the other hand, when the mean diameter of the pigment in the pigment paste is less than 150 nm, the specific surface area is larger, allowing for more effective interaction with light. This enhances the color development of the coating, increasing the intensity and vividness of the color, thereby improving color saturation and chromaticity. In short, a pigment paste with a small diameter of particles, good stability, vivid color, and excellent opacity demonstrates outstanding anti-sedimentation performance and intermittent writing properties in acrylic marker inks. It should be noted that the pigment paste with a small diameter of particles, good stability, and anti-sedimentation performance is not only applicable to cotton-core acrylic marker ink but also to straight liquid acrylic marker ink.

If the mean diameter of the pigment is too small, it can lead to high light transmission and reduced ink coverage; if the mean diameter of the pigment is too large, it can lead to sedimentation of the pigment particles in the pigment paste and poor stability. In some embodiments, the mean diameter of the pigment is in a range of 100 nm to 200 nm. In some embodiments, the mean diameter of the pigment is in a range of 105 nm to 190 nm. In some embodiments, the mean diameter of the pigment is in a range of 110 nm to 180 nm. In some embodiments, the mean diameter of the pigment is in a range of 115 nm to 170 nm. In some embodiments, the mean diameter of the pigment is in a range of 120 nm to 160 nm.

In some embodiments, a weight ratio of the pigment paste to the first water-based acrylic resin is in a range of 1:0.9 to 1:4.5. In some embodiments, the weight ratio of the pigment paste to the first water-based acrylic resin is in a range of 1:1.1 to 1:4.2. In some embodiments, the weight ratio of the pigment paste to the first water-based acrylic resin is in a range of 1:1.5 to 1:4.0. In some embodiments, the weight ratio of the pigment paste to the first water-based acrylic resin is in a range of 1:1.8 to 1:3.8. In some embodiments, the weight ratio of the pigment paste to the first water-based acrylic resin is in a range of 1:1.9 to 1:3.6.

If the pigment paste is too little, it will lead to a decrease in the ink's coverage; if the first water-based acrylic resin is too much, the viscosity will increase, which will lead to uneven dispersion, decrease in stability, and aggregation of pigment particles.

By setting the weight ratio of the pigment paste to the first water-based acrylic resin to be in a range of 1:0.9 to 1:4.5, it is possible to achieve a better covering power, a moderate viscosity of the pigment paste, and a good anti-sedimentation performance.

The cross-linking agent is a substance used to join molecular chains by a chemical reaction to form a three-dimensional mesh structure. A cross-linking reaction between the cross-linking agent and the first water-based acrylic resin enhances the ink adhesion. In some embodiments, a source from which the cross-linking agent is purchased is not specifically limited. For illustrative purposes only, the cross-linking agent is selected from Crestron Imprafix 2794XP, PT-1205 from Guangzhou Lvbao New Material Co. Ltd, F70D from Wuhan Shiquanxing New Material Science and Technology Co. Ltd, Tibon F70D of Wuhan Shiquanxing New Material Technology Co., Ltd, Dibang Nano New Material S-500, Cytec 325, and one or a combination of one or more of Miki 5717W. In some embodiments, the cross-linking agent includes an isocyanate, an amino resin, or the like.

In some embodiments, the cross-linking agent includes a blocked isocyanate. A blocked isocyanate cross-linking agent typically contains a protective group, such as an ester, alcohol, or phenol, which reacts with an isocyanate group to lock the reactivity of the isocyanate. When heated or when a suitable catalyst is added, a closed group is stripped off, releasing the reactive isocyanate group (—NCO). The released isocyanate group (—NCO) reacts with the first water-based acrylic resin containing hydroxyl groups (—OH) to form a urethane cross-linking. The cross-linking and solidification between the water-based acrylic resin and the blocked isocyanate greatly improves the marker ink's adhesion and friction resistance on substrates such as stone and metal, while also imparting a certain degree of bleeding effect to the ink.

In some embodiments, the cross-linking agent includes a partially methylated amino resin. The methoxy groups (—OCH$_3$) in the partially methylated amino resin react with the hydroxyl groups (—OH) of the first water-based acrylic resin, forming a cross-linking structure.

By introducing the cross-linking agent into the marker ink, a cross-linking density of an ink system is enhanced, greatly improving the ink adhesion, which reaches level 0 and also increases the ink's weather resistance and chemical resistance. It should be noted that an adhesion strength of the ink to a substrate is classified using 0-5 levels, where level 0 indicates excellent adhesion with no signs of detachment, level 1 represents 5% detachment, level 2 represents 15% detachment, level 3 represents 35% detachment, level 4 represents 65% detachment, and level 5 represents complete detachment with no adhesion.

In some embodiments, in the marker ink, by weight, the first water-based acrylic resin accounts for 15 to 25 parts, the pigment paste accounts for 25 to 40 parts, the cross-linking agent accounts for 1 to 5 parts, and the remainder is the water.

Setting the first water-based acrylic resin to account for 15 to 25 parts and the pigment paste to account for 25 to 40 parts satisfies the requirement that the weight ratio of the pigment paste to the first water-based acrylic resin be in a range of 1:0.9 to 1:4.5, which allows the ink to have good opacity, with an appropriate pigment paste viscosity and excellent stability against settling. Setting the cross-linking agent to account for 1 to 5 parts avoids the drawbacks of excessive cross-linking agent, such as high viscosity, rapid solidification speed, increased brittleness, and reduced adhesion. At the same time, it prevents the issues caused by insufficient cross-linking agent, such as inadequate adhesion, poor weather resistance, and poor chemical resistance.

By setting the first water-based acrylic resin to account for 15 to 25 parts, the pigment paste to account for 25 to 40 parts, the cross-linking agent to account for 1 to 5 parts, and the remainder to be water, the marker ink can be made to have a moderate viscosity, is not prone to settling, and exhibits good stability.

In some embodiments, the marker ink further comprises a humectant, a surfactant, a pH regulator, a leveling agent, a dispersant, and a preservative. For example, the marker ink further comprises the humectant, the surfactant, and the pH regulator. For example, the marker ink further comprises the humectant, the surfactant, the pH regulator, and the preservative. As another example, the marker ink further comprises the humectant, the surfactant, the pH regulator, the leveling agent, the dispersant, and the preservative.

The humectant refers to a chemical substance that can retain moisture and prevent water loss. For the convenience of a writer, it is required that a marker pen can write normally after being left for a while without a cap, which places a high demand on the ink's moisturizing properties. The humectant can extend the ink's cap-off time. By adding the humectant, dry nibs can be prevented, and the ink's moisturizing properties is enhanced.

In some embodiments, the humectant includes glycerin, propylene glycol, hyaluronic acid, urea, lactic acid, or the like. In some embodiments, the humectant is selected from a combination of one or more of the following: glycerol, ethylene glycol, diethylene glycol, triethylene glycol, 1,2-propylene glycol, 1,3-propylene glycol, 1,3-butanediol, 1,2-pentanediol, polyethylene glycol, and glycidol. The polyethylene glycol may be selected from a combination of one or more of polyethylene glycol 200, polyethylene glycol 400, polyethylene glycol 600, and polyethylene glycol 1000. Polyethylene glycol with a molecular weight greater than 1,000 is a solid, which is difficult to add, and polyethylene glycol with a molecular weight of not greater than 1,000 is a liquid, which is more convenient to be used for operation.

For example, the humectant is selected from a combination of propylene glycol, polyethylene glycol, and ethylene glycol, and a weight ratio of the propylene glycol, the polyethylene glycol, and the ethylene glycol is in a range of (1 to 1.5):1:1. As another example, the humectant is selected from a combination of propylene glycol, polyethylene glycol, and ethylene glycol, and the weight ratio of the propylene glycol, the polyethylene glycol, and the ethylene glycol is 1.2:1:1. The humectant has excellent moisturizing properties.

Humectants such as polyethylene glycol, combined with the inherent moisturizing properties of surface-blocked isocyanates and their reactivity with hydroxyl groups, significantly extend the intermittent writing time of the ink without affecting the drying speed or adhesion of the ink system, which also results in better performance in terms of bleeding and layering effects.

The surfactant is a chemical substance that changes a surface tension of a liquid. In some embodiments, the surfactant is one or a combination of Cocamidopropyl Betaine-35 (CAB-35), Alcohol Ethoxylate-6 (AEO-6), Alcohol Ethoxylate-9 (AEO-9), 1-(2-Hydroxyethyl)-5-nitro-1H-pyrrole-2-carboxaMide (NP-10), and Polysorbate 80 (tween-80). The surfactant improves the wettability of ink on paper or other print media, allowing the ink to spread better, ensuring good fluidity and affinity of ink, and avoiding the formation of uneven coatings or spots. At the same time, the surfactant has anti-foaming properties, which can effectively suppress foam formation during the ink preparation, transportation, and usage processes. This ensures the ink's fluidity and stability, helps maintain stable ink lines, and prevents bubbles from affecting the performance.

The pH regulator is a chemical substance used to regulate and control the acidity or alkalinity (pH) of a solution. In some embodiments, the pH regulator includes an acidic regulator, an alkaline regulator, a buffer, or the like. The acidic regulator includes hydrochloric acid, sulfuric acid, acetic acid, citric acid, or the like; the alkaline regulator includes sodium hydroxide, potassium hydroxide, sodium carbonate, ammonia, or the like; and the buffer includes phosphate buffer, acetate buffer, or the like.

In some embodiments, the pH regulator is selected from a combination of one or more of triethanolamine, dimethylamine, and triethylamine. Triethanolamine, dimethylamine, and triethylamine are all organic bases that are more stable in a system. Triethanolamine is a liquid, which is more convenient to be added.

By adding the pH regulator and keeping the ink in an alkaline environment through regular testing, components of the ink can be effectively prevented from decomposition and precipitation, thus improving the storage stability of the ink. If a pH value is too low, it may lead to a chemical reaction of certain components, affecting the performance of the ink.

The leveling agent is an additive that improves a surface flatness and smoothness of the ink. In some embodiments, a type of the leveling agent includes a surfactant type, a polymer type, a silicone type, a reactive type, and an additive type. In some embodiments, the leveling agent includes products such as DGL 4100 from DGL International Co., Ltd. (DiGao Coatings, China) and BYK-385 from BYK-Chemie GmbH. In some embodiments, the leveling agent is selected from BYK-333 of BYK-Chemie GmbH. BYK-333 is a silicone-based leveling agent that is well-adapted compared to others.

In some embodiments, the dispersant is selected from one or a combination of one or both of BYK-190 and BYK-192 from BYK-Chemie GmbH. By adding the dispersant at the stage of preparing the marker ink, particles of the pigment can be further dispersed, which further ensures that the color of the ink is uniform and stable, and prevents the particles from precipitating or agglomerating.

The preservative is a chemical or natural substance used to inhibit the growth or propagation of microorganisms, e.g., bacteria, molds, yeasts, etc., and thereby prolong the shelf life of the ink. In some embodiments, the preservative is selected from one or a combination of one or more of isothiazolinone and benzisothiazolinone. Adding the preservative effectively extends the useful life of the product, reduces waste, and helps maintain the quality and safety of the product.

In some embodiments, in the marker ink, by weight, the humectant accounts for 3 to 5 parts, the surfactant accounts for 0.1 to 6 parts, the pH regulator accounts for 0.1 to 1 part, the leveling agent accounts for 0.1 to 1 part, the dispersant accounts for 0.1 to 6 parts, and the preservative accounts for 0.05 to 0.2 parts.

By setting the humectant to account for 3 to 5 parts, the surfactant to account for 0.1 to 6 parts, the pH regulator to account for 0.1 to 1 part, the leveling agent to account for 0.1 to 1 part, the dispersant to account for 0.1 to 6 parts, and the preservative to account for 0.05 to 0.2 parts, the synergistic effect between the components can significantly enhance the performance of the marker ink, ensuring smooth, durable, and stable writing, while preventing ink drying, sedimentation, and microbial contamination. Each ingredient works differently, but together ensure the efficiency, safety, and experience of the ink. It is important to note that while the humectant extends the cap-off time of the ink, it also leads to an increased drying time, which can indirectly cause a decrease in ink adhesion. Therefore, more humectant is not always better. By setting the humectant to account for 3 to 5 parts, it is possible to prolong the cap-off time of ink while ensuring that the ink adhesion remains unchanged.

Figure 1:
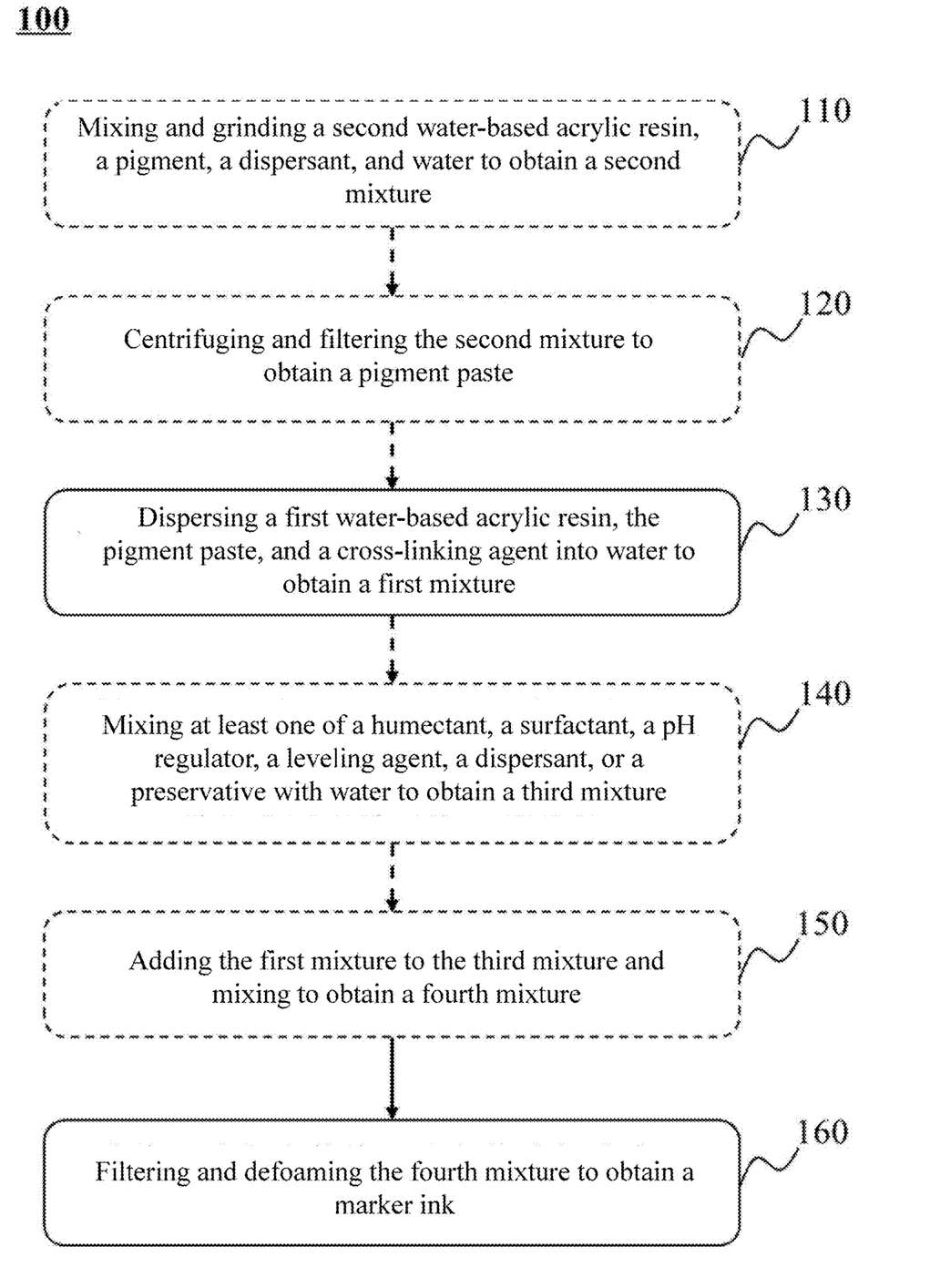
FIG. 1 is a flowchart illustrating a method for preparing a marker ink according to some embodiments of the present disclosure.

FIG. 1 is a flowchart illustrating a method for preparing a marker ink according to some embodiments of the present disclosure. As shown in FIG. 1, a process 100 includes following operations.

In 110, a second water-based acrylic resin, a pigment, a dispersant, and water may be mixed and ground to obtain a second mixture.

The second mixture is a mixture of the second water-based acrylic resin, the pigment, the dispersant, and water.

In some embodiments, a first number of parts of the second water-based acrylic resin, a second number of parts of water, a third number of parts of the dispersant, and a fourth number of parts of pigment are weighed in a reactor at room temperature and stirred well. Next, it is added to a nano-mill and ground.

In some embodiments, the first number of parts is in a range of 5 to 10. In some embodiments, the first number of parts is in a range of 5.5 to 9. In some embodiments, the first number of parts is in a range of 6 to 8. In some embodiments, the first number of parts is in a range of 6.2 to 7.8. In some embodiments, the first number of parts is in a range of 6.5 to 7.5. In some embodiments, the first number of parts is in a range of 6.8 to 7.

In some embodiments, the second number of parts is in a range of 40 to 50. In some embodiments, the second number of parts is in a range of 4 to 49. In some embodiments, the second number of parts is in a range of 42 to 48. In some embodiments, the second number of parts is in a range of 44 to 47. In some embodiments, the second number of parts is in a range of 45 to 46. In some embodiments, the second number of parts is in a range of 45.2 to 45.7.

In some embodiments, the third number of parts is in a range of 2 to 4. In some embodiments, the third number of parts is in a range of 2.1 to 3.9. In some embodiments, the third number of parts is in a range of 2.2 to 3.7. In some embodiments, the third number of parts is in a range of 2.3 to 3.7. In some embodiments, the third number of parts is in a range of 2.5 to 3.5. In some embodiments, the third number of parts is in a range of 2.8 to 3.2.

In some embodiments, the fourth number of parts is in a range of 30 to 40. In some embodiments, the fourth number of parts is in a range of 30.5 to 39. In some embodiments, the fourth number of parts is in a range of 31 to 38. In some embodiments, the fourth number of parts is in a range of 33 to 37. In some embodiments, the fourth number of parts is in a range of 34 to 36.5. In some embodiments, the fourth number of parts is in a range of 35 to 36.

In some embodiments, a rotation speed of mixture is in a range of 500 r/min to 800 r/min. In some embodiments, the rotation speed of mixture is in a range of 520 r/min to 780 r/min. In some embodiments, the rotation speed of mixture is in a range of 550 r/min to 750 r/min. In some embodiments, the rotation speed of mixture is in a range of 560 r/min to 700 r/min. In some embodiments, the rotation speed of mixture is in a range of 590 r/min to 680 r/min.

In some embodiments, a mixture time is in a range of 1.5 h to 3 h. In some embodiments, the mixture time is in a range of 1.6 h to 2.9 h. In some embodiments, the mixture time is in a range of 1.7 h to 2.7 h. In some embodiments, the mixture time is in a range of 1.8 h to 2.5 h. In some embodiments, the mixture time is in a range of 1.9 h to 2.2 h.

In some embodiments, a grinding time is in a range of 3 h to 4 h. In some embodiments, the grinding time is in a range of 3.1 h to 3.9 h. In some embodiments, the grinding time is in a range of 3.2 h to 3.7 h. In some embodiments, the grinding time is in a range of 3.3 h to 3.6 h. In some embodiments, the grinding time is in a range of 3.4 h to 3.5 h.

In some embodiments, a diameter of zirconia beads used for grinding is in a range of 0.1 mm to 1.5 mm. In some embodiments, the diameter of zirconia beads used for grinding is in a range of 0.1 mm to 1.2 mm. In some embodiments, the diameter of zirconia beads used for grinding is in a range of 0.2 mm to 1 mm. In some embodiments, the diameter of zirconia beads used for grinding is in a range of 0.5 mm to 0.8 mm. In some embodiments, the diameter of zirconia beads used for grinding is in a range of 0.3 mm to 0.9 mm.

In some embodiments, a rotation speed of grinding is in a range of 800 r/min to 1500 r/min. In some embodiments, the rotation speed of grinding is in a range of 850 r/min to 1300 r/min. In some embodiments, the rotation speed of grinding is in a range of 880 r/min to 1250 r/min. In some embodiments, the rotation speed of grinding is in a range of 900 r/min to 1200 r/min. In some embodiments, the rotation speed of grinding is in a range of 950 r/min to 1100 r/min.

In a process of preparing the ink, on the one hand, the dispersant is added using the nano-mill; on the other hand, if the rotation speed of grinding is too fast, it will result in unstable pigment, and if the rotation speed of grinding is too slow, it will be inefficient and not easy to achieve the specified diameter. Therefore, adopting the above-described way of preparing the second mixture, a mean diameter of a pigment in a pigment paste may be ensured to be less than 150 nm.

In 120, the second mixture may be centrifuged and filtered to obtain the pigment paste.

In some embodiments, the second mixture is centrifuged in a centrifuge and filtered through a filter paper to obtain the pigment paste.

In some embodiments, a centrifugal angular rotation of centrifugation is in a range of 8000 rpm to 12000 rpm. In some embodiments, the centrifugal angular rotation of centrifugation is in a range of 8500 rpm to 11500 rpm. In some embodiments, the centrifugal angular rotation of centrifugation is in a range of 8800 rpm to 11000 rpm. In some embodiments, the centrifugal angular rotation of centrifugation is in a range of 9000 rpm to 11000 rpm. In some embodiments, the centrifugal angular rotation of centrifugation is in a range of 9,500 rpm to 10,500 rpm.

In some embodiments, a pore size of the filter paper is in a range of 0.22 um to 0.45 um. In some embodiments, the pore size of the filter paper is in a range of 0.24 um to 0.43 um. In some embodiments, the pore size of the filter paper is in a range of 0.25 μm to 0.40 um. In some embodiments, the pore size of the filter paper is in a range of 0.27 um to 0.38 um. In some embodiments, the pore size of the filter paper is in a range of 0.28 um to 0.35 um.

In 130, a first water-based acrylic resin, the pigment paste, and a cross-linking agent into water may be dispersed to obtain a first mixture.

The first mixture refers to a mixture composed of the first water-based acrylic resin, the pigment paste, and the cross-linking agent.

In some embodiments, 15 to 25 parts of the first water-based acrylic resin, and 1 to 5 parts of the cross-linking agent may be dispersed into water and stirred well. Next, 25 to 40 parts of the pigment paste are added to the above system and stirred to obtain the first mixture.

In some embodiments, a rotation speed of mixture is in a range of 500 r/min to 800 r/min. In some embodiments, the rotation speed of mixture is in a range of 550 r/min to 750 r/min. In some embodiments, the rotation speed of mixture is in a range of 580 r/min to 720 r/min. In some embodiments, the rotation speed of mixture is in a range of 600 r/min to 700 r/min. In some embodiments, the rotation speed of mixture is in a range of 630 r/min to 680 r/min.

In some embodiments, a mixture time is in a range of 1.5 h to 3 h. In some embodiments, the mixture time is in a range of 1.6 h to 2.8 h. In some embodiments, the mixture time is in a range of 1.7 h to 2.5 h. In some embodiments, the mixture time is in a range of 1.8 h to 2.3 h. In some embodiments, the mixture time is in a range of 1.9 h to 2.1 h.

In 140, at least one of a humectant, a surfactant, a pH regulator, a leveling agent, a dispersant, or a preservative may be mixed with water to obtain a third mixture.

For example, the humectant, the surfactant, the pH regulator, and the water are mixed to obtain the third mixture. As another example, the humectant, the surfactant, the pH regulator, the preservative, and the water are mixed to obtain the third mixture. As another example, the humectant, the surfactant, the pH regulator, the leveling agent, the dispersant, the preservative, and the water are mixed to obtain the third mixture.

In some embodiments, 3 to 5 parts of the humectant, 0.1 to 6 parts of the surfactant, 0.1 to 1 part of the pH regulator, 0.1 to 1 parts of the leveling agent, 0.1 to 6 parts of the dispersant, and 0.05 to 0.2 parts of the preservative are mixed to obtain the third mixture.

In 150, the first mixture may be added to the third mixture and to be mixed to obtain a fourth mixture.

In 160, the fourth mixture may be filtered and defoamed to obtain the marker ink.

In some embodiments, operations 140 to 150 are mitted, and operations 110 to 130, and 160 are performed to obtain the marker ink. When the process 100 does not include operations 140 to 150, the first mixture is filtered by pumping with filter paper and a filtrate is defoamed to obtain the marker ink. That is to say, the method for preparing the marker ink comprises mixing and grinding the second water-based acrylic resin, pigment, the dispersant, and water to obtain the second mixture; centrifuging and filtering the second mixture to obtain the pigment paste; dispersing the first water-based acrylic resin, the pigment paste, and the cross-linking agent into water to obtain the first mixture; and filtering and defoaming the first mixture to obtain the marker ink.

In some embodiments, operations 140 to 150 are not omitted, and operations 110 to 160 are performed to obtain the marker ink. When the process 100 includes operations 140 to 150, the fourth mixture is filtered by pumping through filter paper and the filtrate is defoamed to obtain the marker ink. That is to say, the method for preparing the marker ink comprises mixing and grinding the second water-based acrylic resin, the pigment, the dispersant, and water to obtain the second mixture; and centrifuging and filtering the second mixture to obtain the pigment paste; and dispersing the first water-based acrylic resin, the pigment paste, and the cross-linking agent into water to obtain the first mixture; mixing at least one of the humectant, the surfactant, the pH regulator, the leveling agent, the dispersant, and the preservative with water to obtain the third mixture, and adding the first mixture to the third mixture and mixing to obtain the fourth mixture; and filtering and deforming the fourth mixture to obtain the marker ink.

In some embodiments, a pore size of filter paper is similar to the pore size of the filter paper in operation 120, as can be referred to in the preceding related description.

In some embodiments, a deforming time is in a range of 30 min to 60 min. In some embodiments, the defoaming time is in a range of 32 min to 55 min. In some embodiments, the defoaming time is in a range of 34 min to 50 min. In some embodiments, the defoaming time is in a range of 36 min to 45 min. In some embodiments, the defoaming time is in a range of 38 min to 42 min.

In some embodiments, a vacuum condition for defoaming is in a range of 0.01 MPa to 1 MPa. In some embodiments, the vacuum condition for defoaming is in a range of 0.02 Mpa to 0.9 Mpa. In some embodiments, the vacuum condition for defoaming is in a range of 0.03 Mpa to 0.6 Mpa. In some embodiments, the vacuum condition for defoaming is in a range of 0.05 Mpa to 0.2 Mpa. In some embodiments, the vacuum condition for defoaming is in a range of 0.06 Mpa to 0.1 Mpa.

By preparing the pigment paste before obtaining the first mixture, it is possible to ensure that the mean diameter of the pigment in the pigment paste is less than 150 nm, and it is possible to obtain an ink with good stability and a good covering property of bright colors. Additionally, by filtering and defoaming the ink, particles in the ink can be made uniform and less foamy to achieve better stability.

In some embodiments, operations 110 to 120 may be omitted, as long as it is satisfied that the mean diameter of the pigment in the pigment paste to be used is less than 150 nm, and operations 130 to 160 are performed to obtain the marker ink.

In some embodiments, operations 110 to 120 and operations 140 to 150 may be omitted, as long as it is satisfied that the mean diameter of the pigment in the pigment paste to be used is less than 150 nm, and operation 130 and operation 160 are performed to obtain the marker ink.

It should be noted that the foregoing description of the method for preparing the marker ink is for exemplification and illustration only, and does not limit the scope of application of the present disclosure. For a person skilled in the art, various corrections and changes can be made to the method for preparing the marker ink under the guidance of the present disclosure. However, these corrections and changes remain within the scope of the present disclosure. In some embodiments, the order in which the operations of FIG. 1 are performed is not limiting. For example, at least one of the humectant, the surfactant, the pH regulator, the leveling agent, the dispersant, or the preservative (e.g., the humectant, the surfactant, and the pH regulator) can be mixed with water to obtain the third mixture, the first water-based acrylic resin and the cross-linking agent can be mixed with the third mixture, and then the pigment paste can be added and mixed to obtain the fourth mixture, and the fourth mixture is filtered and deformed to obtain the marker ink.

One of the embodiments of the present disclosure provides a marker pen. The marker pen may include a nib, a barrel, and a marker ink. The marker ink may include a first water-based acrylic resin, a pigment paste, a cross-linking agent, and water. A mean diameter of a pigment in the pigment paste is less than 150 nm. For more information about the first water-based acrylic resin, the pigment paste, and the cross-linking agent, please refer to the related description above.

A method for preparing a marker ink will be described in detail below by way of Example 1 to Example 5. It should be noted that reaction conditions, reaction materials, and amounts of reaction materials in Example 1 to Example 5 are only intended to illustrate the method for preparing a marker ink and do not limit the scope of protection of the present disclosure.

Example 1

Take 16 g of a second water-based acrylic resin and add it into 64 g of deionized water, then add 4 g of a dispersant and mix well at room temperature, then add 16 g of a BASF L7080 pigment into a reaction kettle with a rotation speed of 800 r/min, and mix them for 2 hours at room temperature. After that, add a mixture obtained to a nano grinder for grinding for 3 hours, with a diameter of zirconium beads of 1 um, and set a rotation speed of the nano grinder to 1000 r/min. After grinding, centrifuge the mixture, then filter a centrifuged liquid through a 0.22 μm filter paper to obtain the pigment paste.

Add 1.5 g of propylene glycol, 1.0 g of ethylene glycol, 1.0 g of polyethylene glycol, 1 g of AEO-9, 1 g of NP-10, 0.1 g of isothiazolinone, and 0.1 g of triethanolamine to deionized water and stir well to obtain a mixture liquid. Add 20 g of a first water-based acrylic resin, 3 g of a cross-linking agent and mix well, and finally add 20 g of the pigment paste and mix well, and then filter the mixture with 0.22 um filter paper to obtain a filtrate, and the filtrate is deformed under a vacuum of 0.08 MPa for 40 minutes to obtain the marker ink. The marker ink obtained had a viscosity of 13.6 cps, a surface tension of 28.5 mN/m, and a median diameter (DM) of 105.4 nm.

The first water-based acrylic resin is a polyester-modified acrylic resin, which was purchased from Guangdong Changzhou Chemical Co., Ltd., with the product number SX-1420. The second water-based acrylic resin was purchased from Joncryl 690 grade. The cross-linking agent was purchased from Guangzhou Lvbao New Materials Co., Ltd., with the product number PT-1205.

Example 2

Take 20 g of a second water-based acrylic resin and add it into 56 g of deionized water, then add 4 g of a dispersant and mix well at room temperature, then add 20 g of a BASF K3580 pigment into a reaction kettle with a rotation speed of 800 r/min, and mix them for 2 hours at room temperature. After that, add a mixture obtained to a nano grinder for grinding for 3 hours, with a diameter of zirconium beads of 1 um, and set a rotation speed of the nano grinder to 1000 r/min. After grinding, centrifuge the mixture, then filter a centrifuged liquid through a 0.22 um filter paper to obtain the pigment paste.

Add 1.2 g of propylene glycol, 1.0 g of ethylene glycol, 1.0 g of polyethylene glycol, 1 g of AEO-9, 0.1 g of isothiazolinone, 0.1 g of triethylamine to deionized water and stir well to obtain a mixture liquid. Add 20 g of a first water-based acrylic resin, 3 g of a cross-linking agent and mix well, and finally add 20 g of the pigment paste and mix well, and then filter the mixture with 0.22 um filter paper to obtain a filtrate, and the filtrate is deformed under a vacuum of 0.08 MPa for 40 minutes to obtain the marker ink. The marker ink obtained had a viscosity of 15.2 cps, a surface tension of 26.6 mN/m, and a mean diameter (DM) of 98.7 nm.

The first water-based acrylic resin is a polyester-modified acrylic resin, which was purchased from Dow under the product number RESIN HF-05A. The second water-based acrylic resin was purchased from Joncryl 690 grade. The cross-linking agent was purchased from Guangzhou Lvbao New Materials Co., Ltd., with the product number PT-1205.

Example 3

Take 20 g of a second water-based acrylic resin and add it into 56 g of deionized water, then add 4 g of a dispersant and mix well at room temperature, then add 20 g of a BASF K3580 pigment into a reaction kettle with a rotation speed of 800 r/min, and mix them for 2 hours at room temperature. After that, add a mixture obtained to a nano grinder for grinding for 3 hours, with a diameter of zirconium beads of 1 um, set a rotation speed of the nano grinder to 1000 r/min. After grinding, centrifuge the mixture, then filter a centrifuged liquid through a 0.22 um filter paper to obtain the pigment paste.

Add 1.2 g of propylene glycol, 1.2 g of ethylene glycol, 1.0 g of polyethylene glycol, 0.3 g of polysorbate 80, 0.3 g of NP-10, 0.15 g of phenylpropylisothiazolinone, and 0.6 g of triethanolamine to deionized water and mix well to obtain a mixture liquid. Add 20 g of a first water-based acrylic resin, 3 g of a cross-linking agent and mix well, and finally add 30 g of the pigment paste and mix well, and then filter the mixture with 0.22 um filter paper to obtain a filtrate, and then the filtrate is defoamed under a vacuum of 0.08 Mpa for 40 minutes to obtain the marker ink. The marker ink obtained had a viscosity of 12.9 cps, a surface tension of 27.6 mN/m, and a median diameter (DM) of 110.9 nm.

The first water-based acrylic resin is a polyester-modified acrylic resin, which was purchased from Dow under the product number RESIN HF-05A. The second water-based acrylic resin was purchased from Joncryl 690 Grade. The cross-linking agent was purchased from Guangzhou Lvbao New Materials Co., Ltd., with the product number PT-1205.

Example 4

Take 20 g of a second water-based acrylic resin and add it into 56 g of deionized water, and then add 4 g of a dispersant and mix well at room temperature, then add 20 g of a BASF K3580 pigment into a reaction kettle with a rotation speed of 800 r/min, and mix them for 2 hours at room temperature. After that, add a mixture obtained to a nano grinder for grinding for 3 hours, with a diameter of zirconium beads of 1 um, set a rotation speed of the nano grinder to 1000 r/min. After grinding, centrifuge the mixture, then filter a centrifuged liquid through a 0.22 um filter paper to obtain the pigment paste.

Add 1.5 g of propylene glycol, 1.2 g of ethylene glycol, 1.0 g of polyethylene glycol, 1 g of polysorbate 80, 0.5 g of AEO-9, 0.1 g of isothiazolone, and 0.6 g of dimethylamine to deionized water and mix well to obtain a mixture liquid. Add 25 g of a first water-based acrylic resin, 3 g of a cross-linking agent and mix well, and finally add 40 g of the pigment paste and mix well, and then filter the mixture with a 0.22 um filter paper to obtain a filtrate, and the filtrate is defoamed under a vacuum of 0.08 Mpa for 40 minutes to obtain the marker ink. The marker ink obtained had a viscosity of 13.7 cps, a surface tension of 25.8 mN/m, and a median diameter (DM) of 115.8 nm.

The first water-based acrylic resin is a polyester-modified acrylic resin, which was purchased from Dow under the product number RESIN HF-05A. The second water-based acrylic resin was purchased from Joncryl 690 grade. The cross-linking agent was purchased from Guangzhou Lvbao New Materials Co., Ltd., with the product number PT-1205.

Example 5

Take 25 g of a second water-based acrylic resin and add it into 56 g of deionized water, then add 4 g of a dispersant and mix well at room temperature, then add 20 g of a BASF K3580 pigment into a reaction kettle with a rotation speed of 800 r/min, and mix them for 2 hours at room temperature. After that, add a mixture obtained to a nano grinder for grinding for 3 hours, with a diameter of zirconium beads of 1 um, set a rotation speed of the nano grinder to 1000 r/min. After grinding, centrifuge the mixture, then filter a centrifuged liquid through a 0.22 um filter paper to obtain the pigment paste.

Add 1.5 g of propylene glycol, 1.2 g of ethylene glycol, 1.0 g of polyethylene glycol, 1 g of polysorbate 80, 0.5 g of AEO-9, 0.1 g of isothiazolinone, and 0.6 g of dimethylamine to deionized water and mix well to obtain a mixture liquid. Add 25 g of a first water-based acrylic resin, 3 g of a cross-linking agent and mix well, and finally add 25 g of the pigment paste and mix well, and then filter the mixture with a 0.22 um filter paper to obtain a filtrate, and the filtrate is defoamed under a vacuum of 0.08 Mpa for 40 minutes to obtain the marker ink. The marker ink obtained had a viscosity of 17.3 cps, a surface tension of 29.5 mN/m, and a median diameter (DM) of 125.2 nm.

The first water-based acrylic resin is a polyester-modified acrylic resin, which was purchased from Dow under the product number RESIN HF-05A. The second water-based acrylic resin was purchased from Joncryl 690 grade. The cross-linking agent was purchased from Guangzhou Lvbao New Materials Co., Ltd., with the product number PT-1205.

Performance Measurement and Analysis of Results (1) Stability Testing

Maker inks obtained in Examples 1 to 5 and commercially available inks 1 to 3 were aged for 15 days at 60° C., and each of the aged inks was tested for changes in a viscosity and diameter. If the change in viscosity of the ink was less than 5%, and the change in diameter of pigment particles in the ink was less than 10%, then it is assumed that the ink has good stability. Test results are shown in Table 1. From data in the table, it can be seen that after high-temperature treatment, the change in viscosity of inks obtained in Examples 1 to 5 is less than 5%, and the change in diameter is less than 10%, and no stratification phenomenon occurs. Therefore, it can be seen that the stability of the inks obtained in Examples 1 to 5 is excellent. After high-temperature treatment, for the commercially available inks 1 to 3, stratification phenomenon occurs in proportion 1 and proportion 2, and the change in viscosity and the change in diameter of the proportion 3 greatly increased, showing a poor stability. Besides, prolonged storage leads to issues such as stratification and poor ink flow, which is unfavorable for use.

TABLE 1

| / | Example 1 | Example 2 | Example 3 | Example 4 | Example 5 | commercially available 1 | commercially available 2 | commercially available 3 |
|---|---|---|---|---|---|---|---|---|
| Viscosity (25° C.)/cps | 13.6 | 15.2 | 12.9 | 13.7 | 17.3 | 14.5 | 15.3 | 15.5 |
| Viscosity/cps after aging 15 days | 14.4 | 15.6 | 13.7 | 14.1 | 17.8 | stratification | stratification | 19.6 |
| Mean diameter at room temperature (DM)/nm | 105.4 | 98.7 | 110.9 | 115.8 | 125.2 | 836.7 | 925.4 | 757.3 |
| Mean diameter (DM)/nm after aging 15 days | 109.3 | 100.7 | 111.8 | 117.5 | 127.4 | / | / | 1093.4 |

(2) Ink Performance Test

According to the national standard QB/T 2777-2015 for an adhesion test manner for a water-based marker ink: draw five consecutive circles with diameters ranging from 20 mm to 30 mm on a glass plate using a marker, after 1 minute, cover the lines with two layers of medical gauze and place a 500 g specialized weight (with a diameter of 50 mm) on top, then move the weight back and forth five times and then check whether the lines have been erased. An adhesion strength of the ink to the substrate is classified into a 0-5 level standard, where level 0 indicates excellent adhesion with no signs of detachment, level 1 represents 5% detachment, level 2 represents 15% detachment, level 3 represents 35% detachment, level 4 represents 65% detachment, and level 5 represents complete detachment with no adhesion. For the convenience of the writer, it is necessary to prolong a cap-off time while ensuring that the ink adhesion remains unchanged. The inks obtained from Examples 1 to 5 and counterparts 1 to 3 were tested by loading the pens, and the adhesion performance and intermittent writability of the inks obtained from the Examples and proportions were tested, respectively, and test results are as shown in Table 2.

TABLE 2

| / | Example 1 | Example 2 | Example 3 | Example 4 | Example 5 | commercially available 1 | commercially available 2 | commercially available 3 |
|---|---|---|---|---|---|---|---|---|
| Adhesion | Level 0 | Level 0 | Level 0 | Level 0 | Level 0 | Level 2 | Level 2 | Level 1 |
| Drying time/s | 61 | 54 | 62 | 59 | 52 | 65 | 63 | 59 |
| Intermittent time/h | 2.3 | 1.6 | 1.8 | 1.5 | 1.2 | 0.5 | 0.3 | 0.2 |

Analysis of Results

The inks obtained from Examples 1 to 5 and comparative examples 1 to 3 were subjected to a pen loading test, and the adhesion performance and intermittent writability of the inks obtained from the Examples and comparative examples 1 to 3 were tested, respectively, as shown in Table 2. The adhesion tests of the inks obtained in Examples 1 to 5 all showed a level 0 performance, demonstrating excellent adhesion. In contrast, the inks from the comparative examples 1 to 3 exhibited level 2 and level 1 adhesion, which were inferior to the adhesion performance of the inks from Examples 1 to 5. The introduction of surface-blocked isocyanates greatly improved the adhesion of the inks. The intermittent writing performance is reflected in the balance between a drying time, an intermittent time, and the adhesion of an ink. As shown in Table 2, the drying times of the inks from Examples 1 to 5 and the proportions are quite similar. However, the inks from Examples 1 to 5 have an extended cap-off time of 1.2 to 2.3 hours, while the inks from comparative examples 1 to 3 had much shorter cap-off times of 0.2 to 0.5 hours, which is less favorable for practical use.

In summary, in the marker ink and a method for preparation thereof of the present disclosure, the pigment is dispersed in a water-based acrylic resin and deionized water. Through a unique nano grinding process, an inkjet pigment paste with a mean diameter of less than 150 nm is prepared. The pigment particles in this inkjet pigment paste are suspended in an ink system, making it less prone to sedimentation and providing good stability, which overcomes the issues found in commercially available cotton-core marker inks, such as ink stratification, dry ink during writing, and color discrepancies. Introducing the surface-blocked isocyanate cross-linking agent into the ink enhances the cross-linking density of the ink system, which greatly improves the ink adhesion by making the adhesion reach level 0. The surface-blocked isocyanate itself has certain moisturizing properties and reactivity with hydroxyl groups. When combined with moisturizers such as polyethylene glycol, it significantly extends the intermittent writing time of the ink without affecting the drying properties and adhesion of the ink system, which improves the ink's performance in smudging and layering. The prepared inkjet pigment paste features a small particle diameter, excellent anti-sedimentation performance, and high stability. These characteristics not only make it suitable for acrylic marker inks but also for direct-liquid acrylic marker inks.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These modifications, improvements, and amendments are intended to be suggested by the present disclosure, and are within the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures, or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated FIGURE allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A marker ink, comprising a first water-based acrylic resin, a pigment paste, a cross-linking agent, and water, wherein
the first water-based acrylic resin is a polyester-modified acrylic resin, the polyester-modified acrylic resin is a polyethylene glycol-modified acrylic resin, the polyethylene glycol-modified acrylic resin includes a resin produced by subjecting a polyethylene glycol 20000 to a co-polymerization reaction with acrylic monomers,
a mean diameter of a pigment in the pigment paste is less than 150 nm, and
in the marker ink, by weight,
the first water-based acrylic resin accounts for 22.5 to 25 parts,
the pigment paste accounts for 25 to 40 parts, and
the cross-linking agent accounts for 1 to 5 parts.

2. The marker ink of claim 1, wherein a weight ratio of the pigment paste to the first water-based acrylic resin is in a range of 1:0.9-1:1.5.

3. The marker ink of claim 1, wherein the cross-linking agent includes a blocked isocyanate.

4. The marker ink of claim 1, wherein the cross-linking agent includes a partially methylated amino resin.

5. The marker ink of claim 1, wherein the pigment paste is prepared from a second water-based acrylic resin, the pigment, a dispersant, and water.

6. The marker ink of claim 1, further comprising a humectant, a surfactant, a pH regulator, a leveling agent, a dispersant, and a preservative.

7. The marker ink of claim 6, wherein the humectant is selected from one or a combination of a glycerol, an ethylene glycol, a diethylene glycol, a triethylene glycol, a 1,2-propanediol, a 1,3-propanediol, a 1,3-butanediol, a 1,2-pentanediol, a polyethylene glycol, and a reduced glycerol ether.

8. The marker ink of claim 6, wherein the pH regulator is selected from one or a combination of a triethanolamine, a dimethylamine, and a triethylamine.

9. The marker ink of claim 6, wherein, by weight,
the humectant accounts for 3 to 5 parts,
the surfactant accounts for 0.1 to 6 parts,
the pH regulator accounts for 0.1 to 1 part,
the leveling agent accounts for 0.1 to 1 part,
the dispersant accounts for 0.1 to 6 parts, and
the preservative accounts for 0.05 to 0.2 parts.

10. A method for preparing a marker ink, comprising:
dispersing a first water-based acrylic resin, a pigment paste, and a cross-linking agent into water to obtain a first mixture, wherein
the first water-based acrylic resin is a polyester-modified acrylic resin, the polyester-modified acrylic resin is a polyethylene glycol-modified acrylic resin, the polyethylene glycol-modified acrylic resin includes a resin produced by subjecting a polyethylene glycol 20000 to a co-polymerization reaction with acrylic monomers,
a mean diameter of a pigment in the pigment paste is less than 150 nm, and in the marker ink, by weight,
the first water-based acrylic resin accounts for 22.5 to 25 parts,
the pigment paste accounts for 25 to 40 parts, and
the cross-linking agent accounts for 1 to 5 parts; and
filtering and defoaming the first mixture to obtain the marker ink.

11. A marker pen, comprising a nib, a barrel, and a marker ink, wherein
the marker ink includes a first water-based acrylic resin, a pigment paste, a cross-linking agent, and water, wherein the first water-based acrylic resin is a polyester-modified acrylic resin, the polyester-modified acrylic resin is a polyethylene glycol-modified acrylic resin, the polyethylene glycol-modified acrylic resin includes a resin produced by subjecting a polyethylene glycol 20000 to a co-polymerization reaction with acrylic monomers,
a mean diameter of a pigment in the pigment paste is less than 150 nm, and in the marker ink, by weight,
the first water-based acrylic resin accounts for 22.5 to 25 parts,
the pigment paste accounts for 25 to 40 parts, and
the cross-linking agent accounts for 1 to 5 parts.

12. The marker ink of claim 5, wherein in the pigment paste, by weight,
the second water-based acrylic resin accounts for 16 parts,
the pigment accounts for 16 parts,
the dispersant accounts for 4 parts, and
the water accounts for 64 parts.

13. The marker ink of claim 12, further comprising a humectant, a surfactant, a pH regulator, and a preservative, wherein based on a total weight of the first water-based acrylic resin, the pigment paste, the cross-linking agent, the humectant, the surfactant, the pH regulator, and the preservative in the marker ink,
the first water-based acrylic resin accounts for 41.1 parts,
the pigment paste accounts for 41.1 parts,
the cross-linking agent accounts for 6.2 parts,
the humectant accounts for 7.2 parts,
the surfactant accounts for 4.1 parts,
the pH regulator accounts for 0.2 parts, and
the preservative accounts for 0.2 parts.

14. The marker ink of claim 5, wherein in the pigment paste, by weight,
the second water-based acrylic resin accounts for 20 parts,
the pigment accounts for 20 parts,
the dispersant accounts for 4 parts, and
the water accounts for 56 parts.

15. The marker ink of claim 14, further comprising a humectant, a surfactant, a pH regulator, and a preservative, wherein based on a total weight of the first water-based acrylic resin, the pigment paste, the cross-linking agent, the humectant, the surfactant, the pH regulator, and the preservative in the marker ink,
the first water-based acrylic resin accounts for 42.2 parts,
the pigment paste accounts for 42.2 parts,
the cross-linking agent accounts for 6.3 parts,
the humectant accounts for 6.8 parts,
the surfactant accounts for 2.1 parts,
the pH regulator accounts for 0.2 parts, and
the preservative accounts for 0.2 parts.

16. The marker ink of claim 14, further comprising a humectant, a surfactant, a pH regulator, and a preservative, wherein based on a total weight of the first water-based acrylic resin, the pigment paste, the cross-linking agent, the humectant, the surfactant, the pH regulator, and the preservative in the marker ink,
the first water-based acrylic resin accounts for 34.6 parts,
the pigment paste accounts for 51.9 parts,
the cross-linking agent accounts for 5.2 parts,
the humectant accounts for 5.9 parts,
the surfactant accounts for 1.0 parts,
the pH regulator accounts for 1.0 parts, and
the preservative accounts for 0.3 parts.

17. The marker ink of claim 14, further comprising a humectant, a surfactant, a pH regulator, and a preservative, wherein based on a total weight of the first water-based acrylic resin, the pigment paste, the cross-linking agent, the humectant, the surfactant, the pH regulator, and the preservative in the marker ink,
the first water-based acrylic resin accounts for 33.8 parts,
the pigment paste accounts for 54.1 parts,
the cross-linking agent accounts for 4.0 parts,
the humectant accounts for 5.0 parts,
the surfactant accounts for 2.0 parts,
the pH regulator accounts for 0.8 parts, and
the preservative accounts for 0.1 parts.

18. The marker ink of claim 5, wherein in the pigment paste, by weight,
the second water-based acrylic resin accounts for 23.8 parts,
the pigment accounts for 19 parts,
the dispersant accounts for 3.8 parts, and
the water accounts for 53.3 parts.

19. The marker ink of claim 18, further comprising a humectant, a surfactant, a pH regulator, and a preservative, wherein based on a total weight of the first water-based acrylic resin, the pigment paste, the cross-linking agent, the humectant, the surfactant, the pH regulator, and the preservative in the marker ink,
the first water-based acrylic resin accounts for 42.4 parts,
the pigment paste accounts for 42.4 parts,
the cross-linking agent accounts for 5.1 parts,
the humectant accounts for 6.3 parts,
the surfactant accounts for 2.5 parts,
the pH regulator accounts for 1.0 parts, and
the preservative accounts for 0.2 parts.

20. The marker ink of claim 5, wherein by weight, the pigment in the pigment paste accounts for 34 to 36.5 parts.

\* \* \* \* \*